United States Patent

Hong

[11] Patent Number: 5,688,447
[45] Date of Patent: Nov. 18, 1997

[54] MASS PRODUCTION METHOD FOR FABRICATING MULTI-LAYER CDS

[76] Inventor: Gilbert H. Hong, 12820 Alta Tierra, Los Altos Hills, Calif. 94022

[21] Appl. No.: 761,569

[22] Filed: Dec. 6, 1996

Related U.S. Application Data

[62] Division of Ser. No. 515,031, Aug. 14, 1995, Pat. No. 5,635,114.

[51] Int. Cl.$^6$ ............................................. B29D 11/00
[52] U.S. Cl. .......................... 264/1.33; 156/242; 156/247; 264/1.37; 264/1.38; 264/1.7; 264/2.1; 264/2.7; 264/21; 264/106; 427/162; 427/240; 425/810
[58] Field of Search ..................... 264/1.33, 2.1, 264/106, 107, 1.37, 1.7, 1.38, 1.9, 2.7, 21; 156/242, 247; 427/162, 240; 425/808, 810

[56] References Cited

U.S. PATENT DOCUMENTS

| | | | |
|---|---|---|---|
| 4,659,407 | 4/1987 | Lacotte et al. | 264/106 |
| 4,759,990 | 7/1988 | Yen . | |
| 4,812,279 | 3/1989 | Nakagawa et al. | 264/2.1 |
| 4,986,938 | 1/1991 | Izuka et al. | 264/1.33 |
| 5,009,818 | 4/1991 | Arai et al. | 264/1.33 |
| 5,017,414 | 5/1991 | Gregg | 264/106 |
| 5,075,147 | 12/1991 | Usami et al. . | |
| 5,362,591 | 11/1994 | Imai et al. . | |
| 5,468,324 | 11/1995 | Hong | 156/247 |

OTHER PUBLICATIONS

G.Hong, "Innovations in Mask Making and Blank Production", 1987, pp. 37–44.
"Compact News", Optical Disk Manufacturing Equipment (ODME), vol. 2, No. 1, Jan. 1995.
Y. Okino, et al., "Developments in fabrication of optical disks", SPIE vol. 329, Optical Disk Technology (1982), pp. 236–241.
S. Horigome, et al., "Novel stamper process for optical disc", SPIE vol. 899, Optical Storage Technology and Applications (1988), pp. 123–128.

*Primary Examiner*—Mathieu D. Vargot
*Attorney, Agent, or Firm*—Thomas E. Schatzel; Law Offices of Thomas E. Schatzel A Prof. Corporation

[57] ABSTRACT

An optical disk records digital information in optically-reflective layers that each vary in thickness between constructive interference of a monochromatic light and destructive interference of the said monochromatic light. The difference in the intensity of a reflected light beam subjected to interferometric constructive and destructive interference is used to communicate digital data from the optically-reflective layers and a detector. The optical disk provides for multiple layers of digital information that are tuned for interferometric response at correspondingly different monochromatic wavelengths of light. Another embodiment of the present invention is a mass-production process for making such an interferometric optical disk. Another embodiment of the present invention is a variation that includes layers that are emitting or absorbing depending on dopants.

8 Claims, 7 Drawing Sheets

MASS PRODUCTION METHOD FOR FABRICATING MULTI-LAYER CDS

RELATED APPLICATIONS

This is a divisional of application Ser. No. 08/515,031 filed on Aug. 14, 1995, now U.S. Pat. No. 5,635,114.

U.S. patent application, Ser. No. 08/207,878, filed Mar. 8, 1994, now U.S. Pat. No. 5,468,324, is incorporated herein by reference.

BACKGROUND OF THE INVENTION

1. Field of the Invention

The present invention relates to duplication processes and devices and more particularly to high-density optical disks and methods and apparatus for the mass duplicating of such data recordings and compact disks for computer, audio and video applications.

2. Description of the Prior Art

Compact discs read only memory (CD-ROM) discs and drives are now ubiquitous in computer data storage, audio recording of musical artists and video. Given the universal demand for CD-ROM titles, the manufacturing of CD-ROM duplicates from masters have assumed very large volumes.

CD-ROM manufacturing is concerned both with duplication fidelity and manufacturing cost. The manufacturing processes used in CD-ROM production closely resemble those used in the fabrication of semiconductors, especially the methods used in mask making.

Mastering, as its name implies, is the process of creating the disc from which all others are produced. The first step in the manufacturing process is to create a master that can be used for replication. A laser can be used to burn pits and lands containing the data into a photoresist surface beginning at the center track and moving outward in a spiral pattern.

After checking a glass master for accuracy, conventional replication machinery makes a stamper. Different replication processes require slightly different stampers, but the function remains the same, embossing the data pattern on the mass-production disc. Through an injection molding process, a series of intermediate impressions are made that provide a generation of negative stampers that produce positive disc images. The family-tree-like structure of this part of the production cycle has given rise to names such as mother, father and sons or daughters for the various disc generations.

Compact discs (CDs) are typically made from a polycarbonate plastic, which is a material that is less vulnerable to water absorption and heat than polymethylmethacrylate (PMMA), which is universally used in laminated videodisks. Videodisks comprise two slices of substrate sandwiched together, so they are more rigid than CDs. Manufacturers take precautions to prevent heat or water-absorption warping, e.g., by using some type of injection molding in which polycarbonate resin is heated and poured into molds that shape the discs. A stamper impresses data patterns into the cooling plastic, and the disc is then put in a vacuum chamber, where a reflective layer of aluminum is added and coated with a protective lacquer. Labels are silk-screened or printed on the lacquer side.

Injection molding has a number of advantages. Plants worldwide use the technique, and its idiosyncrasies are well known. Yields are typically low when a manufacturing plant first opens, and increase substantially as experience is gained. Injection molding's critics claim the process is messy and requires large capital investments in equipment and clean rooms. During molding, polycarbonate distortions can appear in the plastic that impair or deflect a laser reading light. Despite its shortcomings, a number of manufacturing plants operating today use this process.

Minnesota Mining and Manufacturing Company (3M), for example, uses a prior art photo-polymerization (2P) process in which precut polycarbonate precursor resin is inserted between a master and a base plate, and then embossed. This polycarbonate precursor sandwich filling is then cured with ultraviolet light. This replication method has the advantage of being quick, which comes partially by avoiding any heating or cooling of the plastic during production. Critics of this process say yields remain low because improper curing or warpage causes many discs to be rejected.

DOCData of Venlo, The Netherlands, and COMDisc of Los Angeles use two quite different methods that attempt to produce fast, low-cost replication of compact discs by a continuous printing or embossing technique. Both systems have worked in a laboratory setting, but neither is currently available commercially. Although the techniques show promise and have attracted a great deal of attention, no major company has yet committed itself financially to either process.

Masters are original copies of data recordings that are produced from tapes or software provided by artists and programmers. Lasers and electron beams (E-beams) are used as exposure tools for a photoresist carried on glass and photoplates. Semiconductor photomasks are similarly prepared.

Stampers are sub-masters duplicated from masters. Electroplating and photopolymers are two common ways that gaps in resist images are filled to produce reverse-tone sub-master duplicates of the masters so that the ultimate copies manufactured are positives of the masters.

The prior art photo-polymerization (2P) process starts with monomers that are irradiated to form polymers. In data recording disk duplication, such a process requires expensive machinery for ultraviolet irradiation and pressurizing the monomer solutions.

The copending U.S. patent application Ser. No. 08/207,878, now U.S. Pat. No. 5,468,324, incorporated herein describes spin coating as a useful technique for reproducing microstructures as small as 0.4 microns and as shallow as 0.1 microns. In a spin-on-and-peel process, a polymer solution is prepared with solvents and purified by filtering. The polymer is first spin-coated onto a master that is to be duplicated. Next, venting and drying of the polymer provides for an exact, but negative replica of the master to be formed as a thin film on the master. The thin-film replica is cured, and then separated by simply peeling it off from the master. Such method is useful for making plastic stampers of plastic to create standard-density CD's, e.g., that store 600 MB. The spin-on-and-peel technique is also suitable for high-density CD manufacturing.

In conventional injection molding, hot molten plastic is injected under high pressure into a containment cavity. Inside the cavity, a template with images in relief, the stamper, is used as a master to transfer its physical image features to the injected plastic. After time, the hot molten plastic cools and hardens to form a solid plastic platter. The features that are copied this way can represent video, audio and/or computer data.

Photo-polymerization is used to make copies in plastic without using added heat. Instead of using hot molten plastic, a liquid photo-sensitive monomer is injected into the cavity containing the plastic stamper. Ultra-violet radiation is used to cure the monomer while in intimate contact with the stamper, the UV radiation solidifies the liquid monomer into a solid to form the plastic platter.

High-density CDs are needed to accommodate the ever-increasing data storage requirements of users. In high-resolution video, the data storage needs demand huge capacities. For a full length movie, a gigabyte or more of memory storage capacity is needed. The design and manufacturing of high-density CDs adequate for such use is presently restricted by the shortcomings of conventional technology which uses standard sixty-ton pressure injection molding and stampers made of nickel. Since high temperatures are used to liquefy the plastic, the stacking of additional image layers over the first image is impossible using hot plastic because the underlayers would remelt. However, an important high-density CD construction technique that uses multiple image layers of pits and lands promises a solution to very high storage density needs. At a minimum, injection molding alone is not a practical way to manufacture high-density CDs. Various industry consortiums have been formed to cooperate on the development and marketing of high-density CDs. Time, Warner and Toshiba have proposed an alternative two-layer CD structure that can be fabricated by injection molding side "A" then side "B" separately (0.6 mm thick half height) and then joining the two sides back-to-back with aluminum reflective layers in a lamination which yields a 1.2 mm overall thickness. The back-to-back lamination and aluminum reflective layers in between keeps the data images away from the surfaces and thus protects the information from contamination. The two-sided CD is readable with a conventional one-sided CD player, but the diode lasers must be configured to have an unconventional focus length of 0.6 mm, instead of the usual 1.2 mm length. Also it can be read only one side at a time. The second side is accessed by flipping the CD over, as is done with popular vinyl LP records and tape cassettes. Of course, two readers can be combined, one at top and one at bottom, but the equipment would cost more. The method of laminating parts together cannot be used to construct three-layer CDs, because if the over-all thickness is too great, it becomes impossible for the diode laser head to read the deeper layers. Thus to keep the overall thickness within reasonable bounds, multiple layers of thin films would have to be used to make it possible to access the deepest layers. Thin layers are practically impossible to make with injection molding techniques, because it becomes too difficult to maintain a uniform spacing in the cavity and to control warping and shrinkage.

Another CD design consortium, between Sony and Philips, specifies only one reader head on a side, similar to present convention, and uses the standard CD thickness of 1.2 mm. Multiple layers are used that are staged at intervals of 30–40 microns. All the data is accessed from only one side, so the overlying layers must be transparent, or at least translucent. The 3M Corporation has developed a method to manufacture CDs that conforms to the Sony-Philips specification. A photo-polymerization process is used. For example, a layer "A" of a CD is made using standard injection molding techniques. A layer "B" is added to the first layer with a second stamper at the bottom and the first layer at the top with a photo-polymerization monomer layer in between. High pressure is used to force relatively cool liquid monomer into the void between the first layer and the stamper. The pressure is necessary to achieve the intimate material conformance necessary to duplicate the image on the stamper. The injected-in monomer is cured with ultra-violet light, for example, by directing from the top side through the layer "A" plastic. The stamper is conventionally separated from the new CD and sent on for final labeling and printing. The photo-polymerization process introduced the use of monomers and ultra-violet light to cure them, instead of using heating and cooling, as in standard injection molding. Such method is better because more layers can be built-up simply by repeating the same process over and over. Overall thickness can easily be controlled, because each photo-polymerization layer can be a minimum of forty microns thick.

The main advantage of the photo-polymerization process is its usefulness in depositing additional layers of plastics on existing layers of plastics, without disturbing the underlying layers embedded data. But such photo-polymerization process is still an injection method, high pressure is still needed and the making of uniform films precise thickness is difficult. The photo-polymerization process depends on too many variables to control the thickness of each layer very well. Complicated thickness measurement devices could be used to guarantee the desired thirty micron gaps for photo-polymerization material, but that would complicate the process and make the products more expensive.

SUMMARY OF THE PRESENT INVENTION

It is therefore an object of the present invention to provide a high-density optical disk.

It is a further object of the present invention to provide a mass-production method for making multi-layer high-density optical disk copies of masters.

Briefly, one embodiment of the present invention is an optical disk that records digital information in optically-reflective layers that are made of thin plastic films with thickness between zero and several tens of micrometers. These thin films contain microscopic features of land and pits. Generally, total or partial reflective metal coatings are used to direct laser light back to the detectors.

Another embodiment of the present invention is an optical disk that records digital information in optically-reflective layers that each vary in thickness between constructive interference of a monochromatic light and destructive interference of the said monochromatic light. The difference in the intensity of a reflected light beam subjected to interferometric constructive and destructive is used to communicate digital data from the optically-reflective layers to a detector. The optical disk provides for multiple layers of digital information that are tuned for interferometric response at correspondingly different monochromatic wavelengths of light.

Another embodiment of the present invention is a mass-production process for making such an interferometric optical disk, comprising molding a substrate and first image layer by a photo-polymerization process in which an unheated liquid first monomer plastic is injected under pressure to press in intimate contact with a first stamper having a physical relief pattern in plan which represents digital information. Then curing the monomer with ultra-violet light to harden it into a polymer and separating the hardened-polymer substrate and first image layer from the first stamper. A partially reflective layer is deposited on the substrate and first image layer. A liquid second monomer plastic having a first viscosity is poured onto a second stamper having a physical relief pattern in plan which represents digital information independent of the first stamper and the second stamper is spinned. The next step includes curing the liquid monomer to harden it into a polymer film that represents a second image layer. The polymer film is then attached to the partially reflective layer and the substrate and first image layer. The second stamper is separated from the polymer film, and a reflective film is deposited on the separated polymer film.

An advantage of the present invention is that a process is provided that allows several layers to be simply and accurately fabricated in a high-density CD.

Another advantage of the present invention is that thin-film media with multiple layers, multiple channels, and multiple detectors can be accurately fabricated at low costs.

Another advantage of the present invention is that it provides a process that requires no high pressures that can warp the image layers or cause non-uniform layer thickness to develop.

An advantage of the present invention is that a high-density optical disk is provided.

A further advantage of the present invention is that a method is provided for making high-density optical disks.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
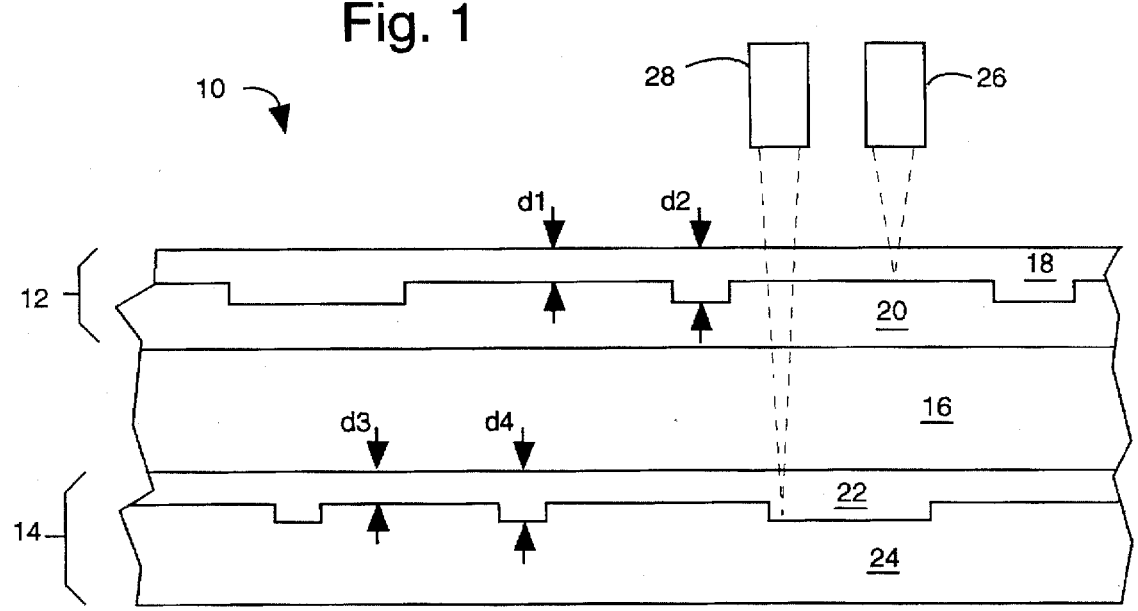
FIG. 1 is a cross-sectional diagram of a first optical disk embodiment of the present invention.

FIG. 1 illustrates an optical disk embodiment of the present invention, referred to herein by the general reference numeral 10. The optical disk 10 is similar to the compact disk (CD) that is highly recognized by the lay population. Digital data is recorded in one or more image layers of the optical disk 10. For example, in the two-layer version of optical disk 10 shown, a first image layer 12 is laminated to a second image layer 14 with a transparent adhesive layer 16 in between. The first image layer 12 comprises a transparent material 18 that contain two thickness from a smaller "d1" to a larger "d2". The physical difference between "d1" and "d2" presents the opportunity for digital bits of data to be represented by physical relief in the first image layer 12. A partially-reflective material 20 allows light to penetrate deeper into the optical disk 10 and into the layers 16 and 14. The second image layer 14 comprises a transparent material 22 that contains two thicknesses a smaller "d3" and a larger "d4". The physical difference between "d3" and "d4" presents another opportunity for digital bits of data to be represented by physical relief in the second image layer 14. A reflective layer 24 completes the second image layer 14.

Standard compact disk specifications for "d1" and "d2–d1" are about 1.2 mm, and layer 14 and detector 28 are absent. Layer 20 is total reflective aluminum and 16 is the protective and labeling layers. In this case, injection molding is appropriate because "d1" and "d2" are relatively thick.

The equivalent Sony and Philips compact disk specifications for "d1" and "d2–d1" are about 1.2 mm, and layer 20 is a partially reflective layer. Layer 16 can be considered as a spacer layer that separates layer 12 from 14 by thirty micrometers. Laser diode and detector 28 is absent but laser diode and detector 26 can be made to have adjustable focal length and be capable of reading either layer 12 or 14 at will by simply changing the focus. Layer 12 can be made with injection molding but layer 14 is properly made with spin and peel (SOAP) and/or photo-polymerization (2P). In this case, layer 22 can be considered as the thin film layer and layer 24 the final totally reflective aluminum layer. Additional protective and labeling layers are added beyond layer 24.

The equivalent Time-Warner-Toshiba compact disk specifications for both "d1" and "d2–d1" are around 0.6 mm. Layer 24 is around 0.6 mm also. Layers 20 and 22 are both totally reflective and therefore data on them can only be read one side at a time. Layer 16 is the laminating glue. Laser diode and detector 28 is absent and laser diode and detector 26 must be re-configured to have a focal length at 0.6 mm. There is no labeling allowed in the data area. All labeling is done in the central ring area, similar to LP records.

The present invention is based on the ability to accurately fabricate thin film between zero to tens of micrometers with relief images via spin on and peel. This allows for the possibility of all plastic thin-film optical storage media where refractive indices variation is utilized to induce reflections. This refers to the situation that layer 20 comprises transparent plastic materials. The only requirement is that the refractive index must be substantially different from that of layer 18. Similarly, the refractive index for layer 24 must be different from that of layer 22. It is the refractive index differentials that induce different laser intensities at "d1" and "d2" and similarly at "d3" and "d4". These are important because in the multiple layer structure, partial reflection can be accomplished in this manner without reflective metal coatings. This allows for the building of more layers.

The fabrication of thin film also allows for an all plastic thin-film optical storage media in the multiple layer structure, with one single detector having an adjustable focal length to read one layer at a time. This refers to the situation where detector 28 can be eliminated and layer 16 is thirty microns or larger. Because of the relatively small depths of focus in most laser optics, layer 14 will be out of focus while detector 26 is focused on layer 12 and vice versa. Again the thin film concept allows adequate separations between layers that is impossible to achieve by any other methods.

Thin film also allows for all plastic thin film optical storage media where interferometric effect is utilized to induce constructive and destructive effects of laser wavefronts in the media with accurate prescribed thickness. In this scheme, multiple detectors with multiple wavelength are used. All layers can be addressed simultaneously. This represents a more sophisticated design. Thickness "d1", "d2", "d3" and "d4" are optimized for specific wavelengths of laser diode in detectors 26 and 28, layer 16 can be basically eliminated, and detectors 26 and 28 do not differ in focal length but differ in wavelength. Layers 18 and 22 can be the same material and layers 20 and 24 can be of the same material. However, layers 18 and 20 will have different refractive indices.

Conventional CDs use one image layer and depend on a system of pits and lands to scatter or reflect light. The intensity of the reflected light is thus affected by the degree to which a laser light is reflected back. The amplitude of the reflected light thus can carry amplitude modulated digital data.

The present invention differs in that the thickness "d1" through "d4" are exceedingly small, and are on the order of the wavelength of light. Light interferometry phenomenon is used to dictate the wavelength of a first laser diode and detector 26 and the size of "d1" and "d2". Similarly, such etalon effect is used to select the wavelength of operation for a second laser diode and detector 28 and the size of "d3" and "d4". Advantage may also be taken of the fact that the focal length of laser diode and detector 28 to layer 14 is very different than that of laser diode and detector 26 to layer 12. For example, the focal length of the former may be 1.2 mm, while the focal length of the second may be thirty microns larger. To take advantage of such focal length differences, the laser diode and detectors 26 and 28 are fitted with appropriate optics, e.g., lenses, using conventional techniques and materials.

Figure 7:
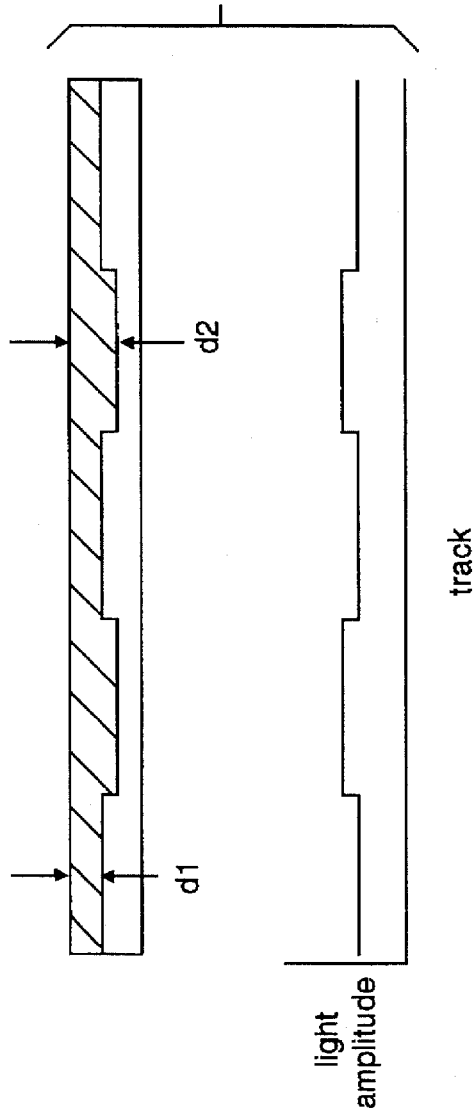
FIG. 7 is a cross-sectional diagram of a resonance-cavity compact disk for 400 nanometers lasers.

Because the relative phases of light reflected from the near and far sides of the transparent layers 18 and 22 can add or subtract from one another, the intensity of the composite reflections can vary significantly. Where the first laser diode and detector 26 is selected to operate at a wavelength of 400 nanometers, the intensity of light reflected from the first image layer 12 will be minimum, e.g., where the transparent layer 18 is 0.37 microns thick. The intensity of light reflected from the first image layer 12 will be maximum, e.g., where the transparent layer 18 is 0.61 microns thick. Thus the contrast of reflected light intensity will be best if "d1" is set to equal a minimum and "d2" is set to equal a maximum, or vice versa. (This is shown in FIG. 7.)

Figure 8:
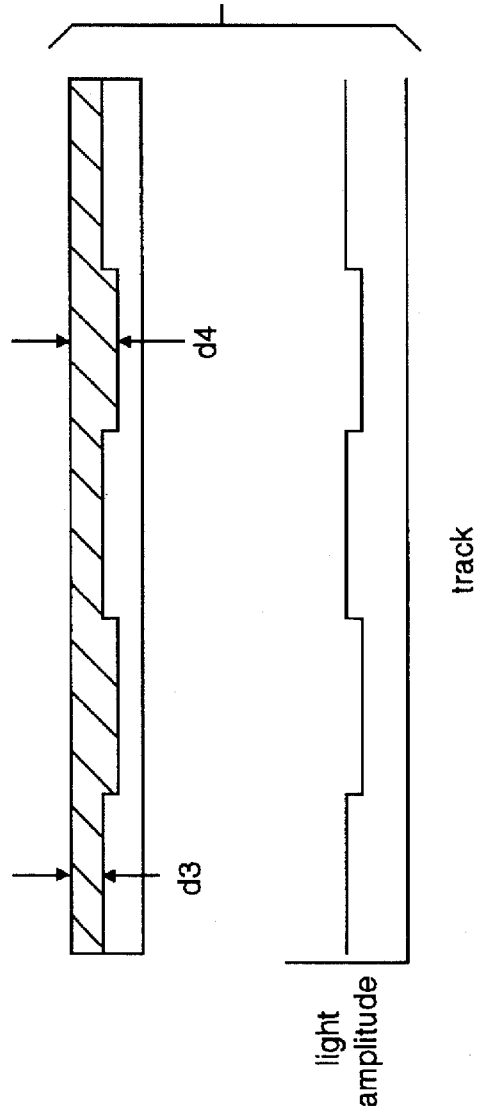
FIG. 8 is a cross-sectional diagram of a resonance-cavity compact disk for 700 nanometers lasers.

Similarly, where the second laser diode and detector 28 is selected to operate at a wavelength of 700 nanometers, the intensity of light reflected from the second image layer 14 will be minimum, e.g., where the transparent layer 22 is 0.47 microns thick. The intensity of light reflected from the second image layer 14 will be maximum, e.g., Where the transparent layer 22 is 0.34 microns thick. Thus the contrast of reflected light intensity will be best if "d3" is set to equal a minimum and "d4" is set to equal a maximum, or vice versa. (This is shown in FIG. 8.)

The two different wavelengths of operation of the laser diode and detectors 26 and 28 thus permits simultaneous data access of the multiple data channels without cross-channel interference. In alternative embodiments of the present invention, more than two image layers and different wavelength laser diode and detectors are used to obtain three or more overlying channels.

Conventional mass production CD fabrication techniques may not be up to the challenge of forming sub-micron features in plastics, or up to the challenge of fabricating two or more such image layers in an optical disk, such as a video CD or computer CD-ROM.

While the inventions here refer to both layers 12 and 14 as thin-film storage devices, at least one image layer can be of the conventional thick-film type (1.2 mm) to provide the physical rigidity of the disks. The illustration that follows assumes that layer 12 is of the thick type and layer 14 is of the thin type.

Figure 2:
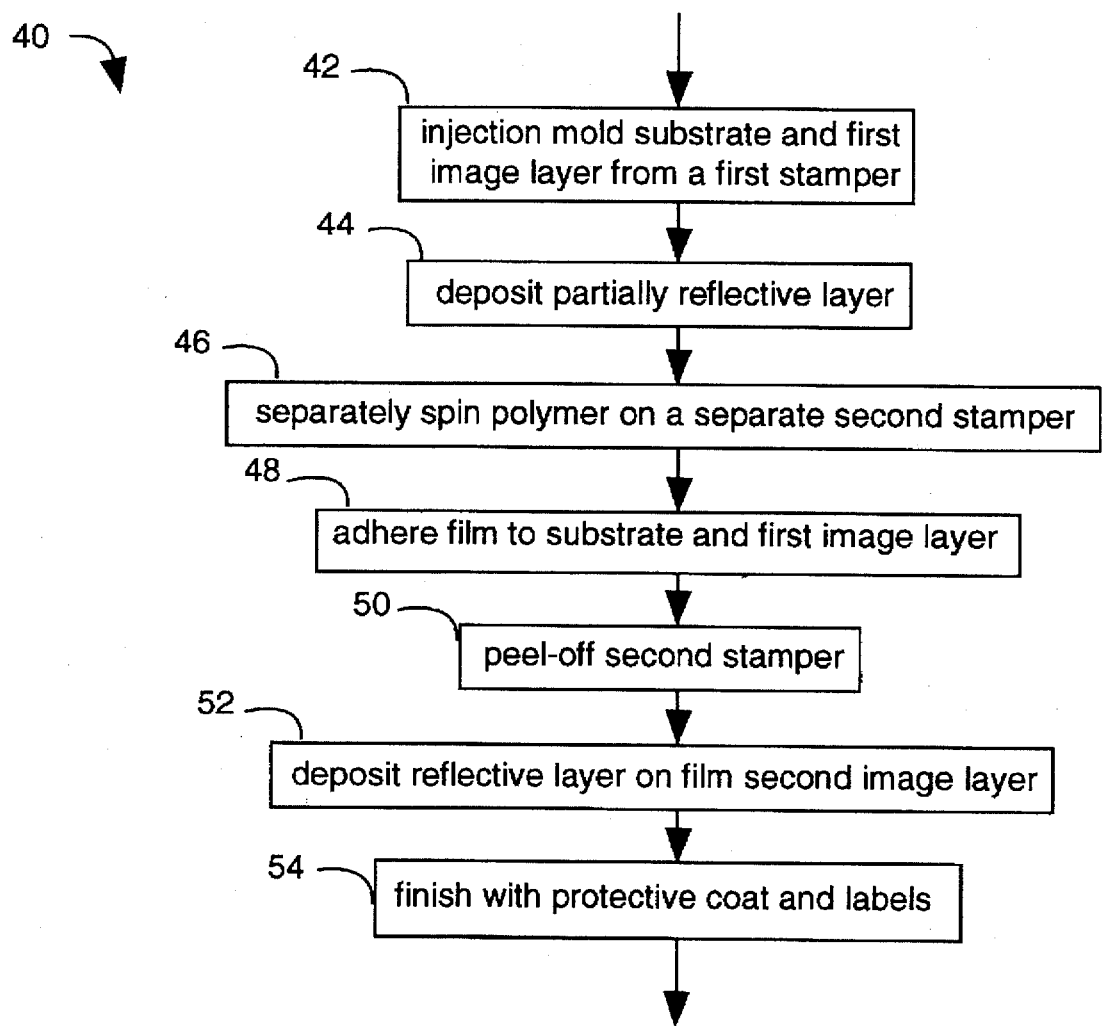
FIG. 2 is a flowchart of a first method embodiment of the present invention for making the optical disk of FIG. 1.

FIG. 2 illustrates a method embodiment of the present invention, referred to by the general reference numeral 40. The method 40 includes a step 42 for making the first image layer and substrate, e.g., layer 18, by the conventional process of injecting a hot molten plastic into a containment cavity with a plastic stamper made of metal. Such stamper has features in relief that are patterned in plan view to represent data for the first image layer 12. Such features in relief rise a height equal to d2–d1. In a step 44, a partially-reflective layer of material, e.g., layer 20 comprising aluminum, is sputtered onto layer 18 using conventional techniques. In a step 46, a polymer film is separately spun on to a separate second stamper that has features in relief that are patterned in plan view to represent data for the second image layer 14. For example, the materials and techniques described in the incorporated copending application are used. The geometric height of the features in the second stamper determine the difference d4–d3, and the combination of the viscosity, spinning speed and spinning time will determine the thickness d3. In a step 48, the spun-on layer 22 is cemented with adhesive layer 16 to the layer 20, thus beginning the build up toward the finished stack comprising disk 10. The laminating layer 16 is cured, either by solvent evaporation or by curing with ultraviolet light exposure, depending on the adhesive materials used. The second stamper is not detached from the layer 22 until such adhesive layer 16 is cured and free of bubbles. In a step 50, the second stamper is peeled from the layer 22. In a step 52, a fully-reflective layer, e.g., layer 24, is deposited on layer 22 with conventional techniques. In a step 54, the optical disk is finished with a protective coating and labels are applied that identify the embedded digital information and the producer source.

The method 40 describes additional steps 44, 46, 48 and 50 to make a simple two-layered compact disk. In steps 46 and 48 the invention calls for the spin coating of either a polymer solution or alternatively a monomer solution that is subsequently cured with UV radiation (photo-polymerization, or 2P process). These two alternatives are generally interchangeable, i.e. polymers can be formed first and dissolved in solutions from films after drying or monomer can be spun first and be cured with radiation. The final thin films are usually identical. The choices are strictly dictated by process designs and the general physical-chemical principles are the same. Fundamentally, the invention calls for spinning on masters as a duplication method whereas in other modes of operation (e.g. 3M's) injection of monomer liquid is employed.

The method 40 can be used also if layer 20 and layer 24 are transparent material (for example, different types of plastic). These materials must have different refractive indices from layers 18 and 22. Spin coating can be used to deposit layers 20 and 24. No metal deposition is needed. Finally, a simple repetition of steps 44, 46 and 48 will result in multilayered compact disks.

Figure 3:
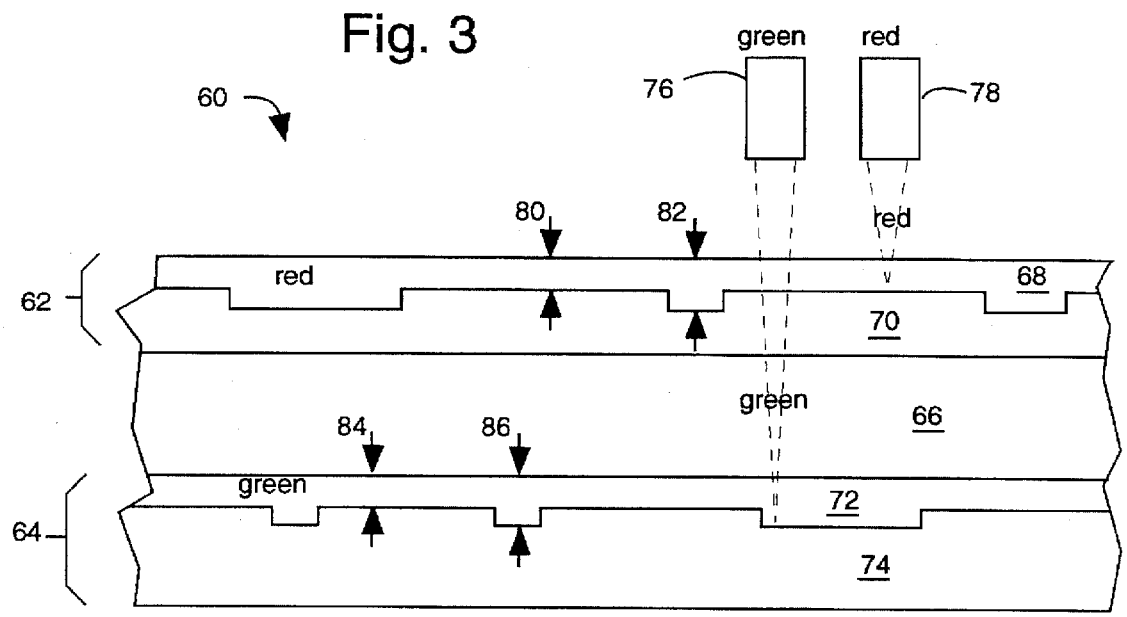
FIG. 3 is a cross-sectional diagram of a second optical disk embodiment of the present invention.

FIG. 3 illustrates an optical disk embodiment of the present invention, referred to herein by the general reference numeral 60. The optical disk 60 is similar to optical disk 10, but depends on a different phenomenon of light. Digital data is recorded in one or more image layers of the optical disk 60 using color, e.g., red and green. For example, in the two-layer version of optical disk 60 shown, a first image layer 62 in red is laminated to a second image layer 64 in green with a transparent adhesive layer 66 in between. The first image layer 62 comprises a transparent material 68 with a doping of red fluorescent dye that varies in thickness. The physical difference in thickness presents the opportunity for digital bits of data to be represented by physical relief in the first image layer 62. A partially-reflective material 70 allows green light to penetrate deeper into the optical disk 60, e.g., into the layers 66 and 64. The second image layer 64 comprises a transparent material layer 72 doped with a green fluorescent dye. Digital bits of data are represented by physical relief in the layer 72. A reflective layer 74 completes the second image layer 64.

A pair of red and green laser diodes and detectors 76 and 78, respectively, are provided that have sufficient energy output to excite the fluorescent dyes and sufficiently sensitive enough to detect the color responses. The degree to which light is reflected back to the laser diodes and detectors 76 and 78 depends on whether the light is reflecting from a pattern of lands 80 or a pattern of pits 82 in layer 62, reflecting from a pattern of lands 84 or a pattern of pits 86 in layer 64. The pits 82 return more light to the detector 78 than do the lands 80. Similarly, the pits 86 return more light to the detector 76 than do the lands 84. The laser diodes and detectors 76 and 78 may include tunable optical filters or color filters to help improve discrimination of the data detected between layers 62 and 64.

The two different wavelengths of operation of the laser diode and detectors 76 and 78 thus permits simultaneous data access of the multiple data channels without cross-channel interference. In alternative embodiments of the present invention, more than two image layers and different wavelength laser diode and detectors are used with corresponding color fluorescent dyes as dopants to obtain three or more overlying channels.

Figure 4:
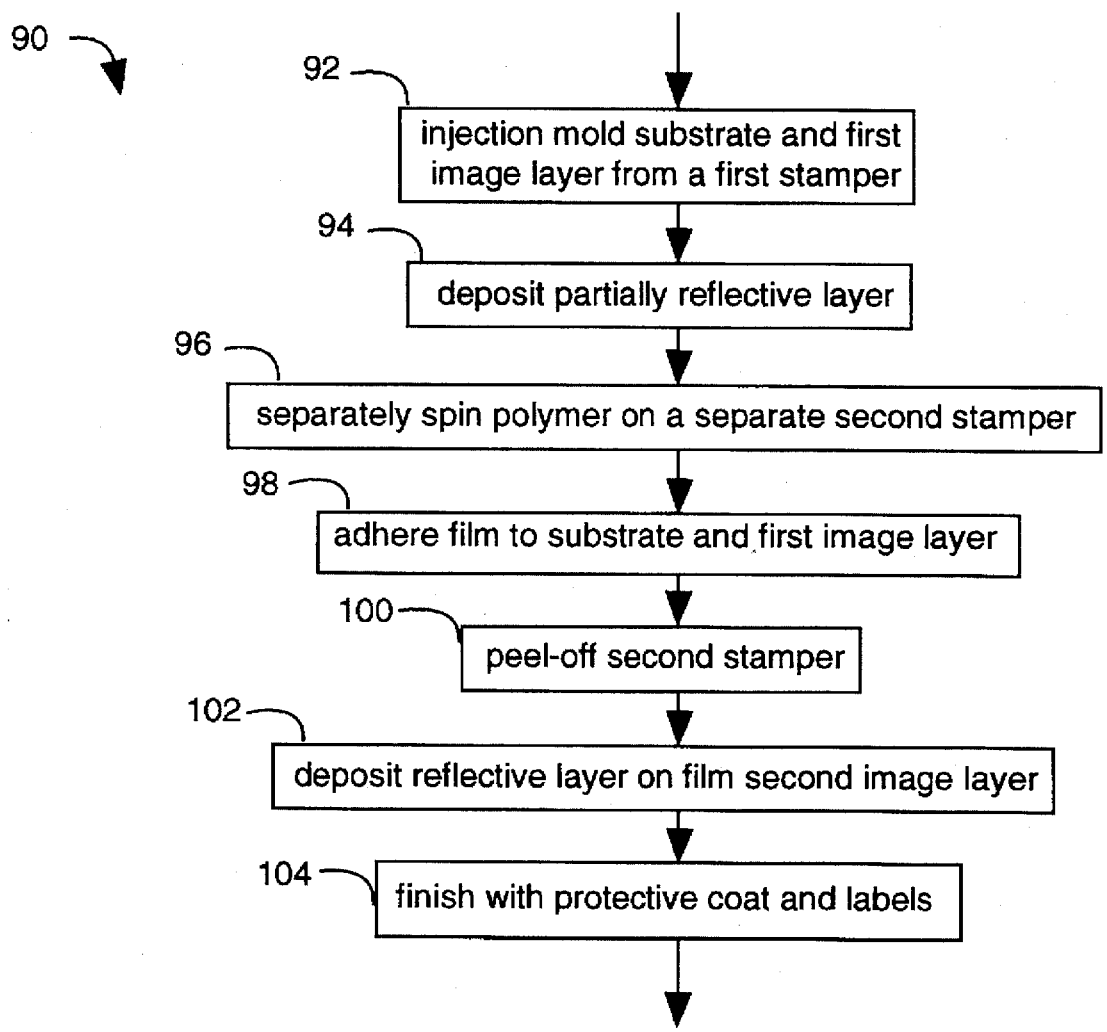
FIG. 4 is a flowchart of a second method embodiment of the present invention for making the optical disk of FIGS. 1 and 2.

FIG. 4 illustrates a method embodiment of the present invention, referred to by the general reference numeral 90. The method 90 includes a step 92 for making the first image layer and substrate, e.g., layer 68, by the conventional process of injecting a hot molten plastic into a containment cavity with a plastic stamper made of metal. Such stamper has features in relief that are patterned in plan view to represent data for the first image layer 62. Such features in relief rise a height equal to "d2" less "d1". In a step 94, a partially-reflective layer of material, e.g., layer 70 comprising aluminum, is sputtered onto layer 68 using conventional techniques. In a step 96 that uses a spin-on-and-peel process of the present invention, a polymer film is separately spun on to a separate second stamper that has features in relief that are patterned in plan view to represent data for the second image layer 64. For example, the materials and techniques described in the incorporated copending application are used. The geometric height of the features in the second stamper determine the difference in lands 80 and pits 82, and the combination of the viscosity, spinning speed and spinning time will determine the thickness. In a step 98, the spun-on layer 72 is cemented with the adhesive layer 66 to the optical disk 60, for example. The adhesive layer 66 is cured, either by solvent evaporation or by curing with ultra-violet light exposure, depending on the adhesive materials used. The second stamper is not detached from the layer 72 until such adhesive layer 66 is cured and free of bubbles. In a step 100, the second stamper is peeled from the layer 72. In a step 102, a fully-reflective layer, e.g., layer 74, is deposited on layer 72 with conventional techniques. In a step 104, the optical disk 60 is covered with a protective coating and labels are applied.

It is assumed that emitters (fluorescent dyes) are doped into layers 68 and 72 in disk 60. In another embodiment, absorbers can also be doped into layers 68 and 72. If absorbers are used then the intensities will behave in the opposite fashion, that is, a thicker area absorbs more and reflects less. It is a mater of choice in design to optimize signal detection. The available combination of materials and detectors will determine the optical arrangements and also the wavelength of light for operations, though the type of drive and media must be compatible in any design.

Again, transparent material of different refractive indices can be used instead of metal reflective layers. Also, spin coating of plastic material will substitute metal depositions.

In an alternative embodiment of the present invention, the fluorescent dyes method can be combined with the resonance cavity concept in disk 10. The thickness of lands 80 and pits 82 can be optimized for the constructive and destructive interference of the red light and thickness of lands 84 and pits 86 can be optimized for the interferometric effect of the green laser. As is true of the present invention, various enhancement methods are not mutually exclusive and can be employed in a single design to achieve the best results.

Figure 5:
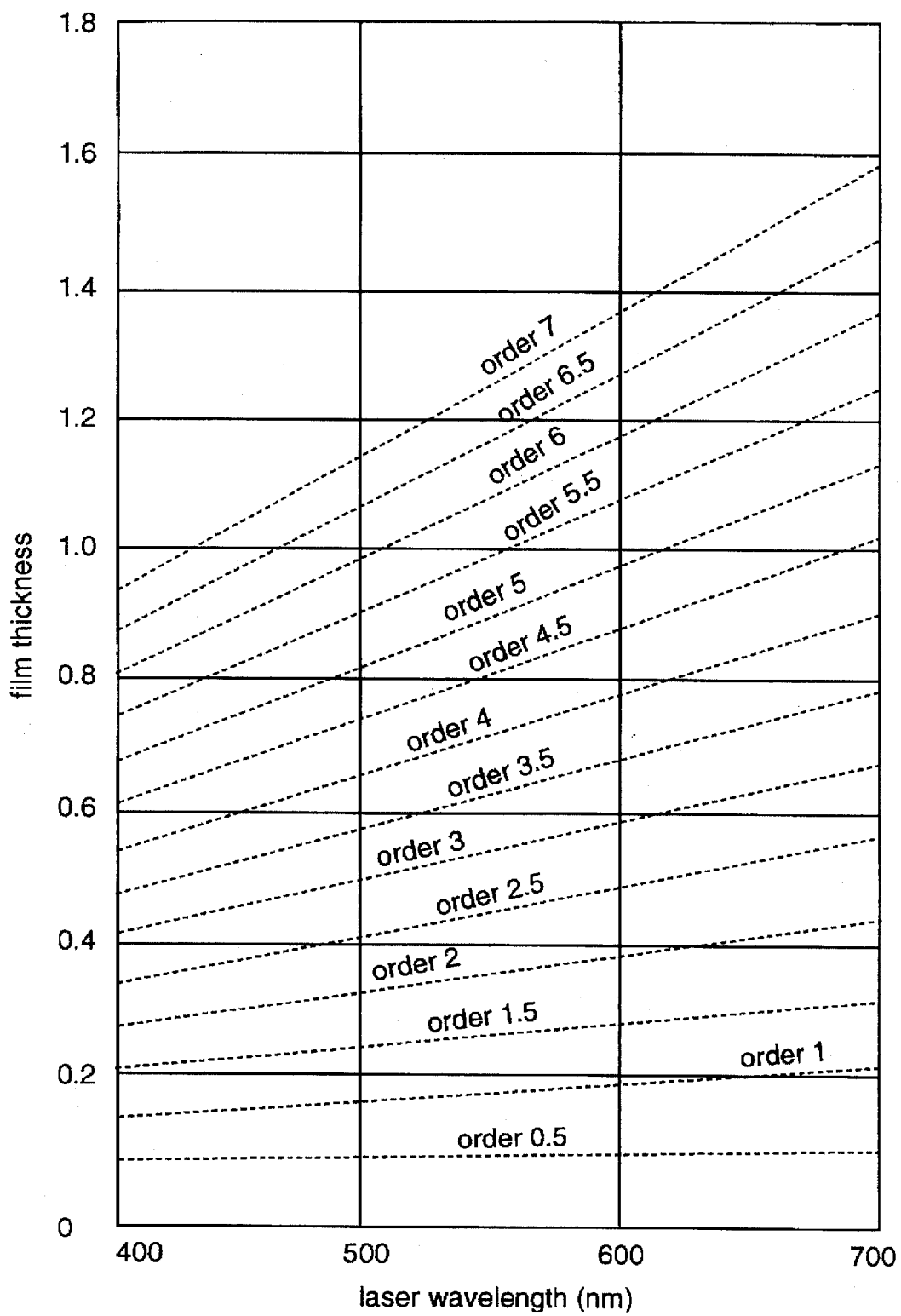
FIG. 5 is a chart of the resonance film thickness that can be used based on various laser light wavelengths.

FIG. 5 charts the resonance film thickness that can be used with various laser light wavelengths. The oscillatory behavior of a cosine function involved leads to resonance and anti-resonance effects. When the thickness times the index corresponds to even and odd multiples of the wavelength of light, the transmitted light intensities reach their extremes. FIG. 5 represents the peaks and valley structure according to the order of constructive and destructive interference. For example, "order 5" represents the fifth order corresponding to constructive interference with maximum transmission and "order 4.5" represents the destructive interference with minimum transmission or maximum reflection.

Figure 6:
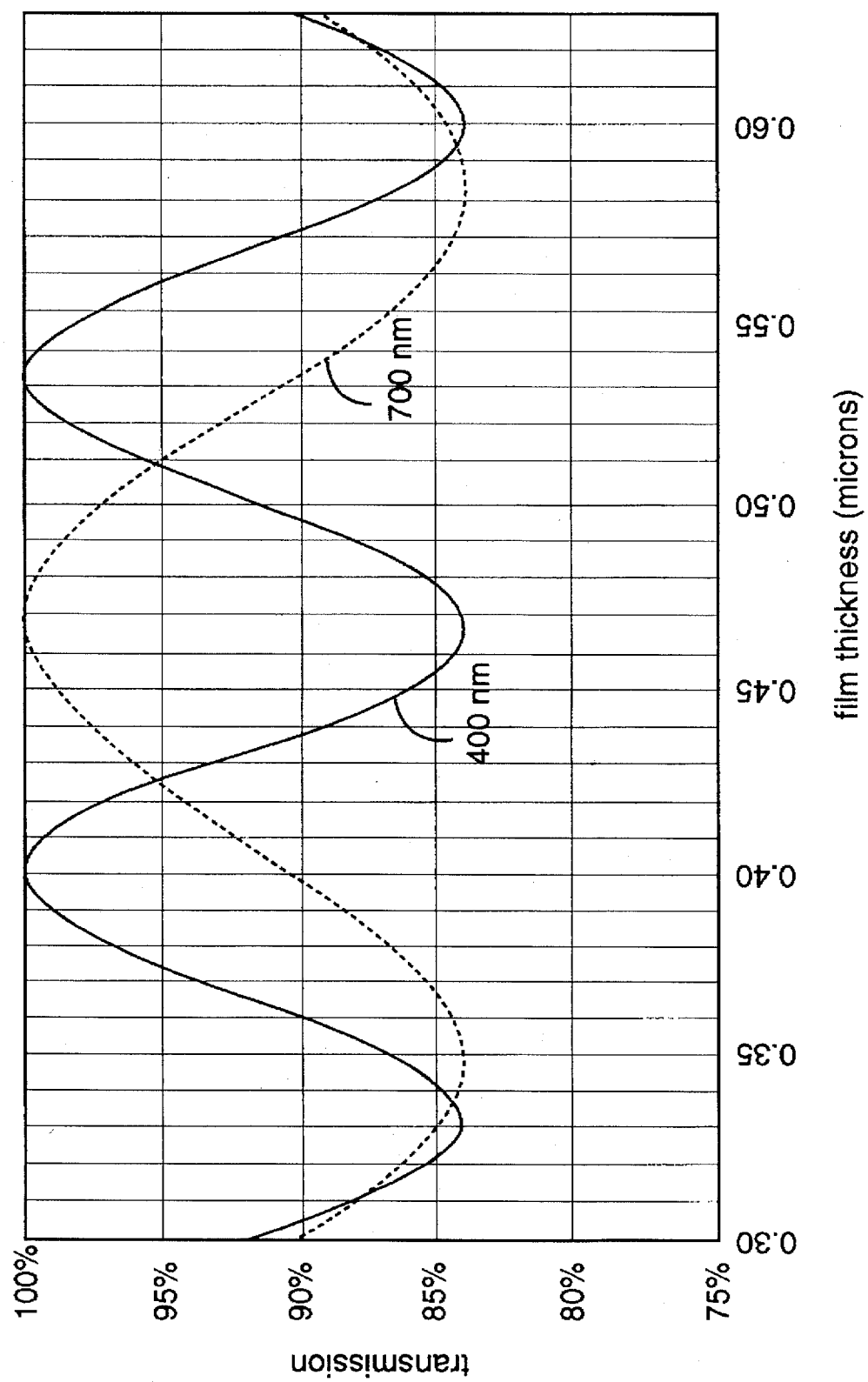
FIG. 6 is a chart plotting film thickness versus laser light transmission percentage for 400 nanometers and 700 nanometers lasers.

FIG. 6 plots film thickness versus laser light transmission percentage, e.g., for 400 nanometers and 700 nanometers lasers. At around 0.34 micron film thickness, the transmission of both 400 and 700 nanometers light is at a minimum, e.g., 84%. But 400 nanometers light reaches a maximum 100% at a film thickness of 0.41 micron. The 700 nanometers light does not reach a maximum until the film thickness is increased to 0.47 microns. A judicious selection of film thicknesses can result in maximum differences in transmission for one wavelength an a minimal difference in transmission for the other wavelength, and vice versa.

Injection molding, photopolymer and the present invention method of spin-on and peel (SOAP) duplication processes are compared in Table I.

TABLE I

| PROCESS | Injection Molding | PhotoPolymer | SOAP |
| --- | --- | --- | --- |
| High Pressure | yes | yes | no |
| Heat | yes | no | no |
| Cure | cooling | UV light | air dry |
| Solvent | no | no | yes |
| Multiple Layers | two at most | 2–10 | 2–10 |
| Thickness | very Thick | 10–30 microns | 1–15 microns |
| Uniformity | 0.1 mm | one micron | 0.1 micron |
| Features | 0.8 micron | 0.4 micron | 0.1 micron |
| Density | low | high | super high |
| Resonance Cavity | no | no | yes |

A two layer compact disk that uses resonance cavities for each layer that are preferably tuned in one embodiment, provide minimum cross talk between the layers by a judicious selection of the laser light frequencies. For example, using 400 nanometers and 700 nanometers as the two laser channel frequencies, layer one cavities of 0.34 micron and 0.47 micron, and layer two cavities of 0.37 and 0.63 micron, provides the responses listed in Table II.

TABLE II

|  | Film Thickness | 400 nanometers Xmit | 700 nanometers Xmit |
|---|---|---|---|
| Layer One | 0.34 micron | 85% | 85% |
|  | 0.47 micron | 85% | 100% |
| Layer Two | 0.37 micron | 94% | 85% |
|  | 0.63 micron | 85% | 85% |

The values of the percentage light transmission for each wavelength of laser light are taken from the chart in FIG. 6. Layer one provides a 15% difference in light transmission for 700 nanometers laser light (85% versus 100%), and no difference in light transmission for 400 nanometers laser light (85% versus 85%). Therefore, there is zero or minimal crosstalk between layers with these choices. Similarly, layer two provides a 9% difference in light transmission for 400 nanometers laser light (94% versus 85%), and no difference in light transmission for 700 nanometers laser light (85% versus 85%). Again, there is zero or minimal crosstalk between layers with these choices. Other such advantageous combinations are also possible, especially with more laser frequency choices.

Every time use is made of polymer solutions and spin and dry to form films, monomer and UV cure can be used to form films. Every time metal deposition is used for reflection, another plastic film of different refractive index can be used to do the same thing and is applied to the pattern, relief or data side. Transparent films are used more than two and up to five layers. Metal reflection is limited to two layers. Every time emitter (fluorescent dyes) is used absorber (absorbing dyes) can be used.

Thin film may or may not resonance cavity but resonance cavity must be generally thin films. Thin film may or may not be wavelength specific but resonance cavity has to be. This is because thin film can be anywhere in the curve (FIG. 6) but by definition, resonance cavity, is made either at the peak or valley.

Generally the first layer is made thick (1.2 mm) with injection molding but the subsequent layer is made thin by spinning either polymer solution or monomer with curing. Techniques are not exclusive, i.e. one can have SOAP 2P, resonance cavity, emitters, absorbers and different focal lengths all at the same time in one complete and complicated design.

Glass with photoresist is only for mastering, whereas stampers are generally metal or plastic with relief. The thin film techniques of the present invention can be used for both, but some laminations are generally called for to gain rigidity.

For multiple layers, either many lasers with various focal lengths or one fixed focal length but movable from layer to layer exists. Different layers in media can be of the same material because detectors are distinguishable from each other (spatial resolution). For multiple layers, many lasers with the same focal length at a fixed location exist. It is necessary to have media that consists of layers that are wavelength specific (frequency resolution). Table III charts various embodiments of the present invention.

TABLE III

|  | Method or Structure | |
|---|---|---|
| Replication |  | (1) Spin On and Peel |
| Plastics | (1) Polymer Solution, Solvent Evaporation | (2) Monomer Liquid, Radiation Cure |
| Media | (1) Thin Film (2) Resonance Cavity | (3) Dopants (emitter or absorber) |
| Back Reflector | (1) Metal Reflection | (2) Plastic of a Different Index |
| Drive, Reader | (1) Spatial Resolution, Variable Focal Length | (2) Spatial Resolution, Variable Focal Length |

Note: Thin films will not work well with spectral resolution. Laser can be either single and tunable or multiple and fixed.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of making high-density compact disk type optical media having a multilayer structure, comprising the steps of:

injection molding a first optical layer with a first stamper used as a master having a first set of data;

coating said first optical layer with a partially-reflective layer over a relief image side;

coating, spinning and curing a polymer film on a second stamper used as a master having a second set of data to produce a second optical layer;

laminating said second optical layer onto said first optical layer with said second stamper still attached;

peeling said second stamper from said second optical layer; and depositing a fully-reflective layer as a final finish.

2. The method of claim 1, further comprising:

coating, spinning and curing additional polymer films on additional stampers used as a masters having corresponding additional sets of data to produce additional optical layers in a stack on said first optical layer;

laminating said additional optical layers onto previous optical layers with a current additional stamper still attached;

peeling said current additional stamper from said additional optical layer; and depositing partially-reflective layers between said additional optical layers and said fully-reflective layer as a final finish.

3. The method of claim 2, further comprising:

causing each optical layer to be separated from its neighboring layers by more that the depth of focus of a laser light source and associated detector used to access said sets of data.

4. The method of claim 2, further comprising: laminating plastic films between each of said optical layers to provide for at least one of the absorption of spurious radiation and the enhancement of reflected laser light signals.

5. A method for mass-producing optical disk copies of two or more independent masters or stampers to increase data storage density, comprising the steps of:

molding a substrate and first image layer by injecting hot molten plastic under pressure to press in intimate contact with a first stamper having a physical relief pattern in plan which represents digital information;

cooling and separating said substrate and first image layer from said first stamper;

depositing a partially reflective layer on said substrate and first image layer;

pouring a liquid monomer having a first viscosity onto a second stamper having a physical relief pattern in plan which represents digital information independent of said first stamper and spinning said second stamper for a first time and a first speed;

curing said liquid monomer to harden it into a polymer film representing a second image layer;

adhering said polymer film to said partially reflective layer and said substrate and first image layer;

separating said second stamper from said polymer film; and depositing a reflective film on said separated polymer film.

6. The method of claim 5, further comprising the steps of:

doping said hot molten plastic with a first color fluorescent dye or absorber and doping said liquid monomer with a second color fluorescent dye, wherein said first and second colors are substantially different.

7. A method for mass-producing optical disk copies of two or more independent masters or stampers to increase data storage density, comprising the steps of:

molding a substrate and first image layer by a photopolymerization process in which an unheated liquid first monomer plastic is injected under pressure to press in intimate contact with a first stamper having a physical relief pattern in plan which represents digital information;

curing said monomer with ultraviolet light to harden it into a polymer and separating said hardened-polymer substrate and first image layer from said first stamper;

depositing a partially reflective layer on said substrate and first image layer;

pouring a liquid second monomer plastic having a first viscosity onto a second stamper having a physical relief pattern in plan which represents digital information independent of said first stamper and spinning said second stamper for a first time and a first speed;

curing said liquid monomer to harden it into a polymer film representing a second image layer;

adhering said polymer film to said partially reflective layer and said substrate and first image layer;

separating said second stamper from said polymer film; and depositing a reflective film on said separated polymer film.

8. The method of claim 7, further comprising the steps of:

doping said first monomer plastic with a first color fluorescent dye and doping said second monomer plastic with a second color fluorescent dye, wherein said first and second colors are substantially different.

\* \* \* \* \*